Patented Aug. 26, 1924.

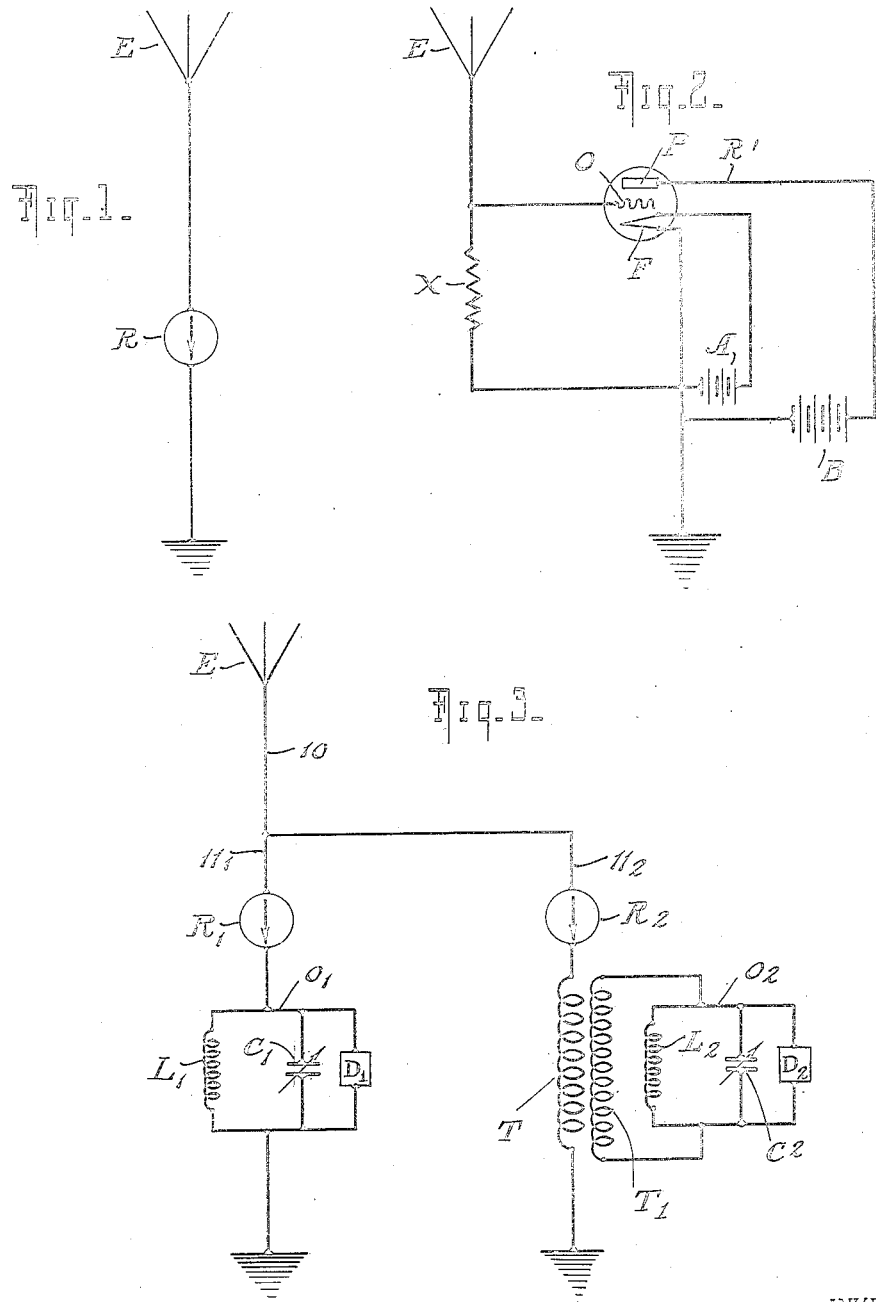

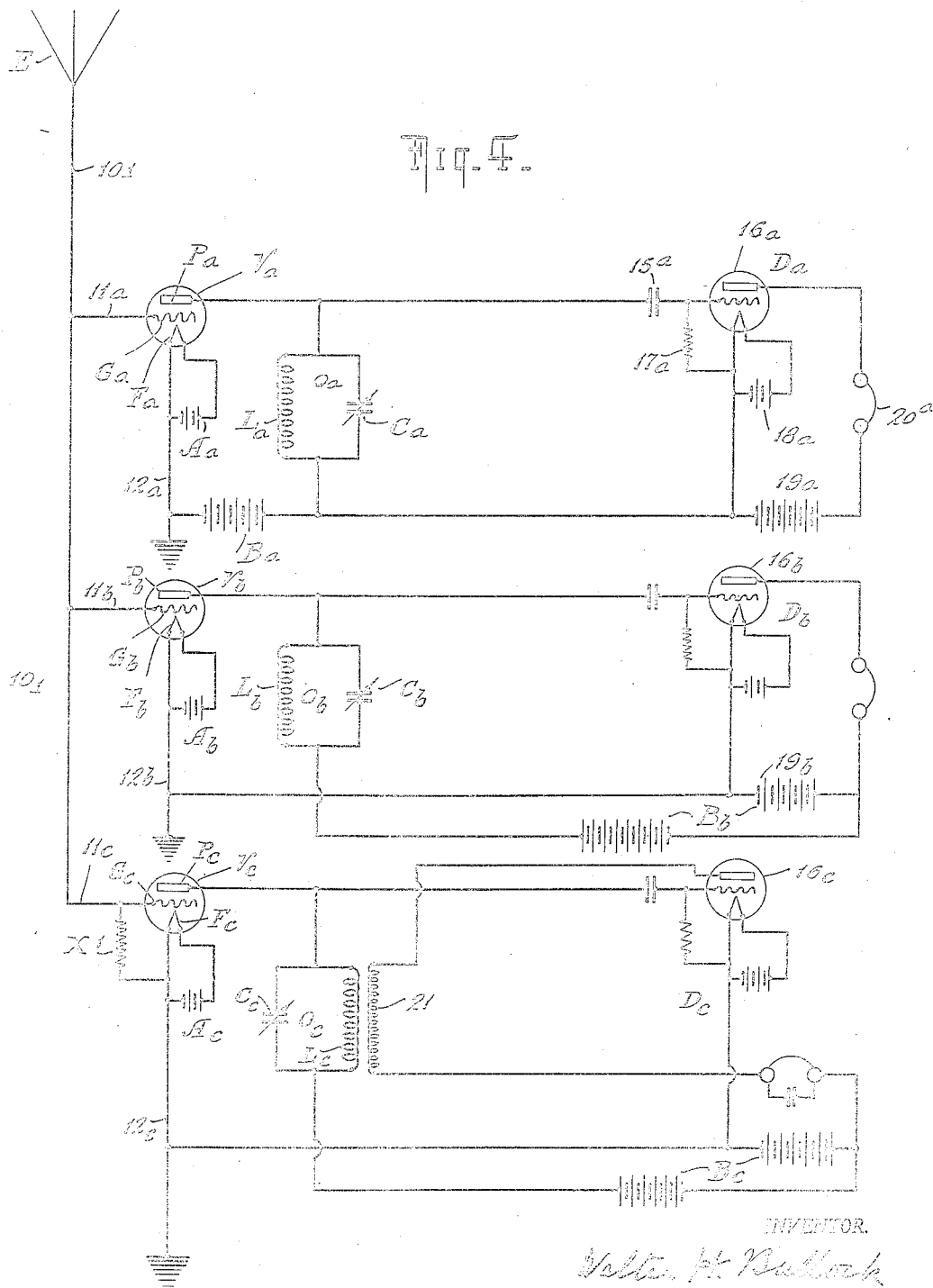

1,506,046

UNITED STATES PATENT OFFICE.

WALTER H. BULLOCK, OF NEW YORK, N. Y., ASSIGNOR OF FORTY-NINE PER CENT TO FREDERIC W. PROCTER, OF NEW YORK, N. Y.

RADIO RECEIVING SYSTEM.

Application filed January 28, 1923. Serial No. 614,847.

*To all whom it may concern:*

Be it known that I, WALTER H. BULLOCK, a citizen of the United States, residing at New York city, in the county of Kings and State of New York, have invented certain new and useful Improvements in Radio Receiving Systems, fully described and represented in the following specification and the accompanying drawings, forming a part of the same.

This invention relates to radio receiving systems.

Objects of the invention are:—To provide a receiving system having a single energy absorbing circuit combined with a plurality of detecting circuits, each of which may be tuned for the reception of messages of any desired wave length without affecting the tuning of the others; to permit a sharper tuning of receiving circuits than was heretofore possible; to avoid the necessity of retuning in case of a change in the characteristics of the energy absorbing circuit; and to prevent a radiation of energy from the energy absorbing circuit of the system.

In radio receiving systems heretofore used, it has been customary to use, as part of the system, an energy absorbing circuit having a natural period of oscillation corresponding to the wave length of the message to be received. When the energy absorbing circuit of such a system is tuned to oscillate for a particular wave length, it is impracticable to use the system to receive at the same time messages in other wave lengths. For this reason it has been customary to use separate receiving systems, each having its own energy absorbing circuit, in order to provide for simultaneous reception of messages of different wave lengths, but where, as on board vessels, it has been necessary to place the antennæ of the various receiving systems close to one another, the inductance linkage between the antennæ has rendered it difficult to tune each receiving system independently of the other.

The sharpness of tuning possible in ordinary receiving systems, and particularly those in which an antenna is used, has been limited by the damping factor of the energy absorbing circuit resulting both from the ohmic resistance in the connection between the antenna and the ground and from the re-radiation of energy from the circuit. Furthermore, in such systems difficulty has been experienced in keeping the system tuned to messages of any particular wave length owing to changes in the characteristics, and particularly the capacity, of the antenna circuit resulting from swinging or other movement of the conductors of the antenna. Such change in the antenna characteristics has introduced particularly serious difficulty in tuning where the antenna has been mounted on a swiftly moving body, such as an airplane, and also in all cases where the antenna and its mounting are subjected to severe wind pressure.

In accordance with my invention, these and other disadvantages of the receiving systems heretofore used are eliminated by the use of an energy absorbing circuit which is made aperiodic, so that the energy absorbed by the circuit from radiations of all different wave lengths produces uni-directional current impulses in the circuit, but no oscillatory currents. With such an aperiodic energy absorbing circuit, I use one or more independent oscillatory circuits which are associated with the energy absorbing circuit in such manner that variations of potential in the energy absorbing circuit are impressed, either directly or indirectly, upon each of the oscillatory circuits. Each of the oscillatory circuits may be tuned so that its natural period of oscillation corresponds to the wave length of a different message to be received. A detector of any ordinary type is connected across each oscillatory circuit. In the operation of my receiving system, therefore, radiations of all different wave lengths produce current impulses in the energy absorbing circuit, while oscillating currents corresponding to radiations of different wave lengths may be produced separately in the various tuned circuits associated with the energy absorbing circuit.

In order that the invention may clearly be understood, I will describe in detail certain specific embodiments of it. I shall, for the sake of illustration, describe a receiving system in which the energy absorbing circuit contains an antenna or aerial. It should be understood, however, that the invention may be carried out also by the use of other energy absorbing circuits, such as loop circuits, or circuits connected to two different points of the ground.

A grounded antenna forms an energy absorbing circuit having a natural period of oscillation dependent upon the capacity between the conductors of the circuit and the ground, and the inductance of the conductors. In accordance with my invention, I render such an energy absorbing circuit aperiodic by inserting a suitable rectifier or "valve" in the connection between the antenna and the ground, so as to permit a flow of current in only one direction in said connection. Potential variations in the energy absorbing circuit thus rendered aperiodic are impressed upon an oscillatory circuit, either directly, by connecting the oscillatory circuit in the energy absorbing circuit or linking it to the energy absorbing circuit through mutual inductance, or indirectly, through the medium of a repeater. In the latter case, a three-element electron emission vacuum tube may be used as the repeater by which potential variations in the energy absorbing circuit are indirectly impressed upon the oscillatory circuit, and this tube may serve also as the rectifier in the energy absorbing circuit.

In the drawings, Figure 1 illustrates diagrammatically an aperiodic energy absorbing circuit embodying the invention, Fig. 2 illustrates a modification containing the type of rectifier which I have found best in practice, Fig. 3 illustrates two ways in which potential differences in an aperiodic energy absorbing circuit may be impressed upon oscillatory circuits and Fig. 4 shows a modification including three oscillatory circuits on which potential variations in the energy absorbing circuit are impressed indirectly thru the medium of vacuum tube repeaters.

In Fig. 1, I have illustrated diagrammatically an aperiodic energy absorbing circuit embodying the invention. This circuit consists of an antenna E connected to the ground through a suitable rectifier indicated diagrammatically at R and serving to permit current to flow from the antenna to the ground, while preventing current from flowing from the ground to the antenna. While the invention is not limited to the use of any particular type of rectifier to render the energy absorbing circuit aperiodic, the rectifier used must be capable of operating with the minute voltages and currents produced in a circuit absorbing radiant electric energy.

In Fig. 2 is illustrated an aperiodic energy absorbing circuit containing the type of rectifier which I have found best in practice. The rectifier R' consists of a three-element electron emission vacuum tube V having a cathode F heated by a battery A for the emission of electrons, a plate P maintained at a potential higher than that of the cathode by a battery B, and a grid element G located between the cathode and the plate. The antenna E is connected to the grid element G, while the cathode element F is connected to the ground. The electrons emitted from the cathode F flow to the plate P, and to the grid element G when the potential of the grid is higher than that of the cathode. Electrons cannot, however, flow from the grid to the cathode. Consequently, when differences of potential between the antenna E and the ground are created by the absorption of radiant electrical energy in the circuit, current flows intermittently from the antenna to the ground, while no current can flow from the ground to the antenna. As a result, there is no oscillation of current in the energy absorbing circuit.

To prevent the building up of too great a negative charge upon the grid G, a leakage path X is provided between the grid and the cathode F. The resistance of this path X is so high that it does not form a radio frequency path from the antenna to the ground and, therefore, does not permit current oscillations of radio frequency between the antenna and the ground. Thus, notwithstanding the leakage path X which bridges the rectifier, the energy absorbing circuit is aperiodic, that is, it has not a natural period of oscillation within the range of radio frequencies.

Fig. 3 illustrates two ways in which potential differences in an aperiodic energy absorbing circuit may be impressed upon oscillatory circuits. The antenna E is connected to the ground by a connector 10 having two branches $11_1$, $11_2$. The branch $11_1$ contains a suitable rectifier $R_1$, while the branch $11_2$ contains a similar rectifier $R_2$. An oscillatory circuit $O_1$ is connected in the branch $11_1$ between the rectifier $R_1$ and the ground. The oscillatory circuit contains an inductance $L_1$ and a variable condenser $C_1$ connected together to form a closed circuit which may be tuned so that an oscillatory current will be set up in it by any series of potential variations in the energy absorbing circuit in which it is connected. A detector $D_1$ is connected across the oscillatory circuit $O_1$ to rectify the radio frequency oscillations in the circuit and produce audible signals in the usual manner.

The branch $11_2$ contains an inductance T between the rectifier $R_2$ and the ground. This inductance is linked with an inductance T' in a closed circuit S containing an oscillatory circuit $O_2$ similar to the circuit $O_1$. This circuit may be tuned to respond to a different series of potential differences in the energy absorbing circuit which are impressed on it by the inductance linkage between the inductances T and T'. Oscillations in this circuit are detected by a detector $D_2$ connected across it.

It should be noted that the rectifiers $R_1$, $R_2$, besides rendering the energy absorbing circuit aperiodic, serve to prevent any flow of current between the two tuned circuits $O_1$, $O_2$, and thus permit the tuning of these circuits independently of each other. It should be understood that the circuits $O_1$, $O_2$, are to be placed far enough apart, so that there is no mutual inductance between them.

In Fig. 4 is shown an aperiodic energy absorbing circuit combined with three oscillatory circuits on which potential variations in the energy absorbing circuit are impressed indirectly through the medium of vacuum tube repeaters. The system exemplified in Fig. 4 is, according to my present knowledge, the best embodiment of my invention.

In Fig. 4, the antenna E is connected, by a conductor 10', having three branches $11^a$, $11^b$, $11^c$, to the grids $G^a$, $G^b$, $G^c$, of three three-element electron emission vacuum tubes $V^a$, $V^b$, $V^c$. The filaments $F^a$, $F^b$, $F^c$ of the three tubes are grounded by means of conductors $12^a$, $12^b$, $12^c$. A leakage path X' of high resistance, for example, one megaohm, is connected between one of the branches of the conductor 10' and one of the grounded conductors. The tubes $V^a$, $V^b$, $V^c$ are provided with the usual cathode heating batteries $A^a$, $A^b$, $A^c$, and the usual anode potential batteries $B^a$, $B^b$, $B^c$.

A closed oscillatory circuit $O^a$ containing an inductance $L^a$ and a condenser $C^a$, one or both of which are variable so as to permit tuning of the circuit $O^a$, is connected between the plate element $P^a$ and the filament element $F^a$ of the tube $V^a$. In the form shown, the oscillatory circuit is connected in series with the anode potential battery $B^a$, but this is not essential.

Across the oscillatory circuit $O^a$ is connected a detector or detecting system $D^a$ which is illustrated as including a condenser $15^a$, a three-element vacuum tube $16^a$, a grid resistance $17^a$, a cathode heating battery $18^a$, an anode potential battery $19^a$, and a telephone $20^a$, all connected in the usual manner.

An oscillatory circuit $O^b$ containing an inductance $L^b$ and a condenser $C^b$, one or both of which are variable, is connected between the filament $F^b$ and the plate $P^b$ of the tube $V^b$. A detecting system $D^b$ is connected across the oscillatory circuit $O^b$. The detecting system $D^b$ is similar to the detecting system $D^a$, except that the connections are such that a part of the anode potential battery $B^b$ of the tube $V^b$ is used as the anode potential battery $19^b$ of the detector tube $16^b$.

An oscillatory circuit $O^c$ containing an inductance $L^c$ and a condenser $C^c$, one or both of which are variable, is connected between the filament $F^c$ and the plate $P^c$ of the tube $V^c$. The detecting system $D^c$ which is connected across the oscillatory circuit $O^c$ is similar to the detecting system $D^b$, except that the plate circuit of the detector tube $16^c$ is made regenerative by the inclusion of an inductance 21 which is in mutual inductive relation with the inductance $L^c$ of the oscillatory circuit $O^c$.

It will be seen that the energy absorbing circuit of the system includes the antenna E and the three-branch connection between it and the ground. The three vacuum tubes $V^a$, $V^b$, $V^c$ serve as rectifiers, one in each of the branches permitting a flow of current in the energy absorbing circuit in one direction only, that is, from the antenna to the ground.

Potential variations in the energy absorbing circuit are impressed on the grids $G^a$, $G^b$, $G^c$ of the tubes $V^a$, $V^b$, $V^c$, so that potential variations which are similar to, and of the same frequency as, those in the energy absorbing circuit are created in the plate-filament circuit of each tube. The potential variations in these circuits are impressed upon the oscillatory circuits $O^a$, $O^b$, $O^c$. These three vacuum tubes, therefore, serve as repeaters for indirectly impressing potential variations in the energy absorbing circuit upon the three oscillatory circuits.

The vacuum tubes $V^a$, $V^b$, $V^c$ serve also to isolate the three oscillatory circuits from each other so as to prevent any flow of current from one of these circuits to another. It should be understood that the oscillatory circuits are located far enough apart to eliminate inductive linkage between them.

As a result, each oscillatory circuit may be tuned independently of the other oscillatory circuits, and independently of the characteristics of the antenna circuit. By tuning the three oscillatory circuits so that they will respond to impulses of different frequency, three sets of signals of different wave lengths may be received simultaneously, one in each of the detectors, although the radiant energy of all three sets of signals is absorbed in a single antenna circuit.

Furthermore, the tuning of any one of the oscillatory circuits may be changed without in any way affecting the tuning of the other oscillatory circuits.

From the illustrative examples which have been described, it will readily be understood that the invention may be carried out so as to associate any desired number of independent oscillatory circuits with a single aperiodic energy absorbing circuit, and that any desired type of detector or detecting and amplifying system may be used in connection with each of the oscillatory circuits.

What is claimed is:

1. A radio receiving system, comprising an energy absorbing circuit, a plurality of three-element electron emission vacuum tubes having their grid and filament elements connected in parallel in said circuit so as to prevent a flow of current in one direction therein, a leakage path between the grid and filament elements of one of said tubes to prevent the grids from acquiring a static negative charge and having a resistance too high to permit radio frequency current oscillations in the energy absorbing circuit, a plurality of oscillatory circuits, one connected between the plate and the filament elements of each of said tubes, separate means for varying the natural period of each of said oscillatory circuits, and a detector associated with each oscillatory circuit.

2. A radio receiving system, comprising an antenna, a connection between said antenna and the ground having a plurality of parallel branches, an oscillatory circuit associated with each of said branches in such manner that potential variations in the energy absorbing circuit are impressed upon it, a rectifier in each branch of said connection, said rectifiers being arranged to prevent a flow of current in one direction in the energy absorbing circuit and to prevent a flow of current between the oscillatory circuits, separate means for varying the natural period of each of the oscillatory circuits, and a detector associated with each oscillatory circuit.

3. A radio receiving system, comprising an antenna, a plurality of three-element electron emission vacuum tubes, a connection between the antenna and the grid element of each of said tubes, a connection between the filament element of each tube and the ground, a leakage path between the grid and filament elements of one of said tubes to prevent the grids from acquiring a static negative charge and having a resistance too high to permit radio frequency current oscillations, said tubes and said leakage path forming the only conductive path between the antenna and the ground and forming with the antenna an aperiodic energy absorbing circuit, a plurality of oscillatory circuits, one connected between the plate element and the filament element of each of said tubes, separate means for varying the natural period of each of the oscillatory circuits, and a detector associated with each oscillatory circuit.

In testimony whereof I have hereunto set my hand.

WALTER H. BULLOCK.